Jan. 6, 1931.                W. McKEE                1,788,167
                    MOTOR DRIVEN CONVEYER ROLLER
                        Filed July 1, 1927
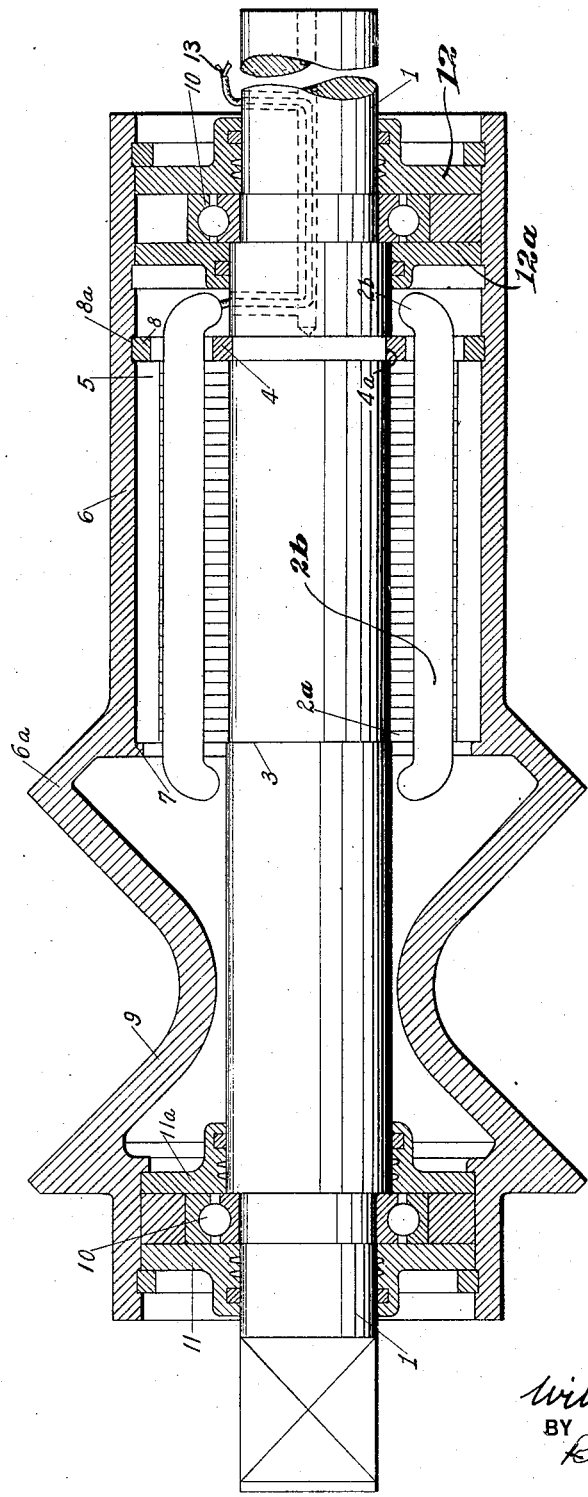
INVENTOR
Willis McKee
BY
Richey&Watts
ATTORNEYS Patented Jan. 6, 1931

1,788,167

UNITED STATES PATENT OFFICE

WILLIS McKEE, OF CLEVELAND, OHIO

MOTOR-DRIVEN CONVEYER ROLLER

Application filed July 1, 1927. Serial No. 202,831.

This invention relates to conveyer rollers of the type in which the rollers are driven by individual motors and is especially concerned with a motor driven roller which can be operated at a relatively high speed and by an alternating current of relatively high frequency.

In the drawing accompanying and forming a part of this specification the figure shows in longitudinal central section one form of apparatus embodying my invention.

The non-rotating supporting shaft 1 carries the non-rotating stator of a motor. This stator may include laminations 2a and windings 2b held in place on the shaft 1 between a shoulder 3 and a locking ring 4 seated in a groove 4a in the shaft or otherwise fixed thereto. The rotor 5 of the motor is disposed radially in line with the stator 2 and as shown in the figure is disposed on the inner side of an annular member 6 which is rotatably supported on the shaft 1. The rotor 5, includes laminations preferably disposed between a shoulder on the member 6 and a ring 8 fitted in a groove 8a in member 6, but it will be understood that the rotor 5 may be maintained in proper position with respect to member 6 by any suitable means.

An article conveying annular member 6a of less diameter than member 6 is located at one end of member 6 and out of radial alignment therewith. Its article conveying surface 9 is here shown as of V or concave shape for rods, bars and the like but it may be shaped to accommodate articles of any shape. It will be noted that the effective article conveying surface of member 6a is of much smaller diameter than would be possible if such surface were disposed in radial alignment with the motor parts either with or without the provision of a motor cooling gas passage between the motor parts and such surface. The member 6a may be connected integrally or otherwise to member 6 by which it is rotated. As here shown it is supported to rotate on bearings 10 on shaft 1 but it may, of course, be supported by any other suitable means. Suitable bearing housings 11, 11a, 12 and 12a permit relative expansion, and adjustment of the shaft 1 and member 6 and also exclude liquid, dirt and other harmful substances from the motor parts. It will be noted that the motor is more or less enclosed and, therefore, protected from substances which are ordinarily encountered in the places where this device will be used and which are harmful to the motor.

Electric lead lines 13 extend from a source of current (not shown) to the stator.

When current flows in the lines 13 and stator the rotor is rotated and members 6 and 6a are rotated. Any article contacting with the top of the roller will be advanced thereby in a linear direction.

In prior art rollers of the individual motor driven type it has heretofore been necessary to employ relatively powerful motors. This was due primarily to the slow speed of rotation of the motor, which was determined by the diameter of the roller and the linear speed at which the articles to be conveyed must be moved along. Since the roller housed the motor its diameter was relatively large, and therefore its revolutions per minute had to be correspondingly low. Since the peripheral speed was limited, the motor was limited to use with driving currents of relatively low frequency.

Since the speed of rotation and frequency of current used were low the horsepower developed by the motor and the torque of the roller were low. Therefore correspondingly larger motors were employed to develop the power and torque required to convey the articles. The efficiency of such motors was relatively low.

As the horsepower developed by a motor or engine is usually about proportional to the speed at which it operates, it is desirable to operate such power units at as high a rate of speed as is consistent with general practice, because by so doing, greater power is developed within a unit of a given size and it can be operated more efficiently. The peripheral speed of the conveying surface of conveyer rollers is determined by the operating conditions and usually such speeds have been so slow that the conveyer rollers could not be operated efficiently and motors were required of a much higher potential capacity than if they were to operate at a higher rate of speed. In order to obtain operation at the slow speeds required in many cases it was necessary to use a current of very low frequency as 5 to 15 cycles. A given motor develops about the same torque at frequencies say from 60 down to 25 cycles, but when operated at low frequencies such as 5 and 15 cycles the torque diminishes rapidly. If, therefore, a given motor is operated by a current of 25 cycles as against 18½ cycles the power actually developed is several times that developed at the lower frequency. Part of this increase in power is due to the higher speed of rotation of the motor and part of it is due to the greater torque at the higher frequency. By positioning the effective conveying surface out of radial alignment with the rotor I am enabled to make such surface materially less in diameter than if disposed in radial alignment with the rotor and so effect the two economies above mentioned. I am also able in many cases to avail myself of the 25 or 60 cycle current which is used in common practice and avoid the use of a motor generator set which is required where the current must be transformed to lower frequencies. By my invention the motor size is decreased and the speed and current frequency of operation is materially increased. Such installation is not only cheaper to construct but much cheaper to operate. The conveying surface may be a groove as shown, or cylindrical, or of any desirable shape.

It will be understood that my improved device is capable of use in conveying highly heated articles, for example, rods, bars, billets, sheets, strip and in general any articles to be conveyed in metal working plants where the articles may be at or above a red heat. By disposing the article conveying portion of the device out of radial alignment with the motor part it is possible to dissipate the heat acquired by the conveyer from the articles being conveyed without artificial cooling between the motor parts and the article conveying portion of the device, inasmuch as the motor parts can be maintained at normal temperatures because of the heat radiating surface of the member 6 and the heat derived from the article being conveyed may be dissipated by radiation before reaching member 6 adjacent to the motor parts. Therefore, my device is capable of operating efficiently without requiring artificial cooling.

Having thus described one form of device embodying my invention so that others skilled in the art may be enabled to practice my invention what I desire to secure by Letters Patent is defined in what is claimed:

1. A motor roller comprising a shaft, a non-rotating motor stator thereon, an annular, elongated member rotatably supported on said shaft and carrying a motor rotor in position to rotate about said stator, the said member having a concave outer surface for conveying and positioning heated articles, said surface being disposed out of radial alignment with the said stator and rotor and having a diameter less than the diameter of the rotor carrying portion thereof.

2. A conveyer roller comprising a non-rotating shaft carrying a non-rotating stator, a motor rotor rotatable about the stator, an annular member carrying the rotor and rotatably supported upon the shaft, the said member having a generally V-shaped article conveying portion of less diameter than the rotor carrying portion and disposed out of radial alignment with the rotor.

3. A motor roller comprising a shaft, a non-rotating motor stator thereon, an annular elongated member rotatably supported upon said shaft carrying a motor rotor in position to rotate about said stator, the said member having a concave outer surface for conveying and positioning heated articles, the said surface being disposed out of radial alignment with the said stator and rotor and having a diameter less than the diameter of the rotor carrying portion of the said member.

4. A conveyer roller unit comprising a non-rotating shaft, a roller member disposed about the shaft and maintained spaced therefrom by bearings located at each end of the shaft, a stator carried by the shaft and a rotor carried by the roller member, said roller member having a portion at one end free from the rotor, and which portion is formed with a concave article carrying surface having a minimum diametrical dimension less than the corresponding dimension of that part of the roller member housing the rotor and stator.

In testimony whereof I hereunto affix my signature this 10th day of June, 1927.

WILLIS McKEE.